(12) United States Patent
Brück et al.

(10) Patent No.: US 9,038,374 B2
(45) Date of Patent: May 26, 2015

(54) DELIVERY DEVICE AND TANK CONFIGURATION FOR A REDUCING AGENT AND MOTOR VEHICLE HAVING A TANK CONFIGURATION

(75) Inventors: Rolf Brück, Bergisch Gladbach (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 113 days.

(21) Appl. No.: 13/417,500

(22) Filed: Mar. 12, 2012

(65) Prior Publication Data

US 2012/0186237 A1 Jul. 26, 2012

Related U.S. Application Data

(63) Continuation of application No. PCT/EP2010/062943, filed on Sep. 3, 2010.

(30) Foreign Application Priority Data

Sep. 11, 2009 (DE) .......................... 10 2009 041 179

(51) Int. Cl.
*F01N 3/00* (2006.01)
*F01N 3/20* (2006.01)
*F01N 13/16* (2010.01)

(52) U.S. Cl.
CPC ............. *F01N 3/2066* (2013.01); *F01N 13/16* (2013.01); *F01N 2610/10* (2013.01); *F01N 2610/1406* (2013.01); *F01N 2610/1426* (2013.01);

(Continued)

(58) Field of Classification Search
CPC . F01N 3/22066; F01N 13/16; F01N 2610/10; F01N 2610/1426; F01N 2610/1473; F01N 2900/1814; F01N 2610/1406; Y02T 10/24
USPC .................................................... 60/274–324
See application file for complete search history.

(56) References Cited

U.S. PATENT DOCUMENTS

| | | | | |
|---|---|---|---|---|
| 4,517,445 A | * | 5/1985 | Tatsumi et al. | 392/444 |
| 4,807,584 A | * | 2/1989 | Davis | 123/557 |
| 5,718,208 A | * | 2/1998 | Brautigan et al. | 123/516 |

(Continued)

FOREIGN PATENT DOCUMENTS

| DE | 10 2004 051 746 A1 | 4/2006 |
|---|---|---|
| DE | 102006061736 A1 | 7/2008 |

(Continued)

OTHER PUBLICATIONS

International Search Report of PCT/EP2010/062943, Dated November 25, 2010.

*Primary Examiner* — Jesse Bouge
(74) *Attorney, Agent, or Firm* — Laurence A. Greenberg; Werner H. Stemer; Ralph E. Locher (57) ABSTRACT

A delivery device for a reducing agent includes a metallic housing, at least one externally mounted metal suction pipe and an external pressure port. A metallic base plate, at which at least one pump and ducts are provided, is disposed inside the housing. The suction pipe, the housing, the metallic base plate, and the pump are in heat-conducting contact with each other. An elongate heating element is disposed next to the suction pipe. A tank configuration for a reducing agent and a motor vehicle having a tank configuration, are also provided.

16 Claims, 3 Drawing Sheets

(52) U.S. Cl.
CPC . *F01N2610/1473* (2013.01); *F01N 2900/1814* (2013.01); *Y02T 10/24* (2013.01)

(56) References Cited

U.S. PATENT DOCUMENTS

| | | | | |
|---|---|---|---|---|
| 5,988,213 | A | * | 11/1999 | Yoshioka ..................... 137/590 |
| 6,063,350 | A | * | 5/2000 | Tarabulski et al. ......... 423/239.1 |
| 6,065,452 | A | * | 5/2000 | Yoshioka ..................... 123/509 |
| 6,283,731 | B1 | * | 9/2001 | Yoshioka ................... 417/423.3 |
| 7,520,270 | B2 | * | 4/2009 | Uhara .......................... 123/509 |
| 7,647,767 | B2 | * | 1/2010 | Osaku et al. .................... 60/286 |
| 7,836,684 | B2 | * | 11/2010 | Starck et al. .................... 60/286 |
| 7,937,934 | B2 | | 5/2011 | Plougmann |
| 7,980,227 | B2 | * | 7/2011 | Eck et al. ...................... 123/509 |
| 7,992,546 | B2 | * | 8/2011 | Eck et al. ...................... 123/509 |
| 8,301,020 | B2 | * | 10/2012 | Wildegger .................... 392/479 |
| 8,358,921 | B2 | * | 1/2013 | Haeberer et al. ............... 392/449 |
| 8,359,831 | B2 | * | 1/2013 | Chmielewski et al. ........... 60/286 |
| 2004/0109773 | A1 | * | 6/2004 | Mashimo et al. .......... 417/423.3 |
| 2007/0075467 | A1 | * | 4/2007 | Osaku et al. ..................... 266/81 |
| 2007/0202019 | A1 | * | 8/2007 | Nishina et al. .................. 422/163 |
| 2009/0038292 | A1 | * | 2/2009 | Plougmann ....................... 60/286 |
| 2009/0078692 | A1 | * | 3/2009 | Starck ........................... 219/260 |
| 2009/0100824 | A1 | * | 4/2009 | Starck et al. .................... 60/286 |
| 2009/0127265 | A1 | * | 5/2009 | Magnusson et al. ........... 220/564 |
| 2009/0183778 | A1 | * | 7/2009 | Wildegger ....................... 137/13 |
| 2009/0230136 | A1 | * | 9/2009 | Dougnier et al. ......... 220/592.01 |
| 2011/0016852 | A1 | * | 1/2011 | Haeberer et al. ................ 60/295 |

FOREIGN PATENT DOCUMENTS

| | | |
|---|---|---|
| DE | 102007027413 A1 | 12/2008 |
| DE | 102007050272 A1 | 4/2009 |
| DE | 102008005196 A1 | 7/2009 |
| DE | 102008045958 A1 | 3/2010 |
| EP | 1435458 A1 | 7/2004 |
| EP | 2080874 A2 | 7/2009 |
| JP | 2002527660 A | 8/2002 |
| JP | 2003502568 A | 1/2003 |
| JP | 2005337404 A | 12/2005 |
| JP | 2008115784 A | 5/2008 |
| JP | 2009057863 A | 3/2009 |
| WO | 0079108 A1 | 12/2000 |
| WO | 03/016687 A1 | 2/2003 |
| WO | 2007/017080 A1 | 2/2007 |
| WO | 2007/126366 A1 | 11/2007 |
| WO | 2008080690 A1 | 7/2008 |
| WO | 2009053176 A1 | 4/2009 |

* cited by examiner

DELIVERY DEVICE AND TANK CONFIGURATION FOR A REDUCING AGENT AND MOTOR VEHICLE HAVING A TANK CONFIGURATION

CROSS-REFERENCE TO RELATED APPLICATION

This is a continuation, under 35 U.S.C. §120, of copending International Application No. PCT/EP2010/062943, filed Sep. 3, 2010, which designated the United States; this application also claims the priority, under 35 U.S.C. §119, of German Patent Application DE 10 2009 041 179.8, filed Sep. 11, 2009; the prior applications are herewith incorporated by reference in their entirety.

BACKGROUND OF THE INVENTION

Field of the Invention

The present invention relates to a device for delivering liquid reducing agent and/or reducing agent precursor from a tank configuration. The invention also relates to a tank configuration for a reducing agent and a motor vehicle having a tank configuration.

The exhaust gas of internal combustion engines typically contains substances, the emission of which into the environment is undesirable. For example, in many countries, the exhaust gas of internal combustion engines may contain nitrogen oxide compounds ($NO_x$) only up to a certain limit value. Aside from engine-internal measures through which the emission of nitrogen oxide compounds is reduced by the selection of as suitable an operating point of the internal combustion engine as possible, after-treatment methods have also become established through which a further a reduction in nitrogen oxide emissions is possible.

One option for further reducing nitrogen oxide emissions is so-called selective catalytic reduction (SCR). In that case, a selective reduction of the nitrogen oxides to form molecular nitrogen ($N_2$) takes place by using a reducing agent. One possible reducing agent is ammonia ($NH_3$). In that case, ammonia is often not stored in the form of ammonia, but rather an ammonia precursor is stored which is converted into ammonia as required. The ammonia precursor is referred to as a reducing agent precursor. One significant possible reducing agent precursor which can be used in motor vehicles is urea (($NH_2)_2CO$). Urea is preferably stored in the form of a urea-water solution. Urea and, in particular, urea-water solution is not harmful to health and is easy to distribute and store. A urea-water solution of that type with a urea content of 32.5% is marketed under the trademark "AdBlue."

It is common for a urea-water solution to be carried onboard in a tank system in the motor vehicle and to be dosed in a portioned manner into the exhaust system through the use of an injection system including a pump and an injector. The consumption of urea for the reduction of undesired nitrogen oxide compounds in the exhaust gas amounts to up to 10% of the fuel consumption of the motor vehicle concerned. It is necessary for the reducing agent to be supplied to an injector at a defined pressure, for the portioned dosing of reducing agent. A problem with the provision of reducing agent at a defined pressure is that a urea-water solution generally freezes at low temperatures. A urea-water solution with a urea content of 32.5%, for example, freezes at temperatures of approximately −11° C. Frozen liquid urea generally cannot be delivered by a pump. At the same time, a pump device can easily be destroyed due to the ice pressure generated when freezing occurs. It is important for a pump device for urea to reach a state of operational readiness quickly even at low outside temperatures, because particularly large amounts of harmful emissions are generally released upon the commencement of driving with a motor vehicle. Furthermore, an injection system must not be damaged by the freezing of the reducing agent precursor contained therein.

SUMMARY OF THE INVENTION

It is accordingly an object of the invention to provide a delivery device and a tank configuration for a reducing agent as well as a motor vehicle having a tank configuration, which overcome the hereinafore-mentioned disadvantages and alleviate the highlighted technical problems of the heretofore-known devices, configurations and vehicles of this general type. It is sought, in particular, to propose a particularly inexpensive, durable, reducing agent delivery device, which can be reactivated quickly even at low temperatures.

With the foregoing and other objects in view there is provided, in accordance with the invention, a delivery device for a reducing agent. The delivery device comprises a metallic housing having an outside, at least one metallic suction pipe fastened to the outside and an external pressure line port. A metallic base plate is disposed in the metallic housing. At least one pump and ducts are provided at the metallic base plate. The suction pipe, the metallic housing, the metallic base plate and the at least one pump are in heat-conducting contact with one another. An elongate heating element is disposed adjacent the at least one suction pipe.

Within the context of the invention, the expression "reducing agent" also encompasses a reducing agent precursor such as, for example, a urea-water solution, preferably with a urea fraction of 32.5 percent by weight.

A fundamental underlying concept of the delivery device according to the invention is that of permitting particularly easy heating of the device when the reducing agent in the delivery device freezes. For this reason, all components filled with liquid reducing agent are fastened to a common metallic base plate through the use of which the components are in heat-conducting contact with one another. It is thus possible for efficient heating of the device according to the invention to be realized through the use of a single elongate heating element along (parallel to) the suction pipe.

The suction pipe of a delivery device according to the invention is generally disposed in a tank for reducing agent. Since the heating element is disposed adjacent or parallel to the suction pipe along the suction pipe, efficient heating of the reducing agent in a tank situated around the suction pipe is also realized. It is firstly possible in this way for the reducing agent provided there to be quickly melted, and therefore also quickly and easily sucked in. Secondly, an ice sheet which may have been formed in the reducing agent tank around the suction pipe is melted, in such a way that the suction cannot cause a negative pressure to form under the ice sheet, which negative pressure would hinder or even prevent the delivery of reducing agent out of the reducing agent tank.

The heating element is preferably pressed against the suction pipe through the use of a clamp. The clamp is composed of heat-conducting material, for example aluminum. The clamp is constructed so as to bear over a large area against an inner surface of the suction pipe, in such a way that good heat transfer is provided from the clamp to the pipe jacket. The heating element is, for example, brazed, soldered or welded to the clamp, in such a way that good heat transfer is also provided between the heating element and the clamp. The clamp is preferably formed as a bent metal sheet with a radius in the expanded state slightly larger than the radius of the inner surface of the suction pipe. The clamp is thus seated under preload in the suction pipe and need not be cohesively fixed therein. The clamp may, if appropriate, have bores for setting the heat transfer from the heating element to the suction pipe.

The mounting of the important components which contain reducing agent, that is to say primarily the pump and the ducts, on a metallic base plate, furthermore permits simple assembly of the device according to the invention. It is not necessary for the components to be mounted directly in the housing. The components may rather be pre-mounted on the metallic base plate and then inserted as an assembly into the metallic housing.

In accordance with another particularly advantageous feature of the delivery device of the invention, ducts are formed in the metallic base plate, and the suction pipe, the pump and the line port are fluidically connected through the use of the ducts in the metallic base plate.

The (one-piece) metallic base plate may be formed, for example, as a milled and/or cast part. It is thus possible for ducts to be produced in the metallic base plate in a simple manner, for example as bores. In the case of a cast part, the ducts may be produced in a simple manner through the use of casting cores. The provision of the fluidic connections between the individual components of the delivery device directly through the use of ducts in the metallic base plate reduces the number of individual parts required, and therefore has a contributory effect in making the assembly of the device even simpler and therefore less expensive. A fast introduction of heat from the base plate into the ducts is also made possible in this way, in such a way that reducing agent present in the ducts is quickly liquefied.

The metallic base plate may be provided with protruding bearing surfaces, in such a way that the mounting or exchange of components (such as the pump, valves and pressure sensors) can take place from above, without it being necessary for the metallic base plate to be removed from the metallic housing.

The metallic base plate (and if appropriate further components/all the components specified herein as metallic) is preferably produced (at least at the surface, but very particularly preferably solidly or entirely) from or with steel. If appropriate, it is likewise possible for aluminum to be used as a material for the metallic base plate. Therefore, particularly good heat conduction from the heating element to the individual components of the delivery device is possible through the metallic base plate.

The metallic housing is preferably produced by deep drawing (as a deep-drawn part). In order to connect the suction pipe to the metallic housing, the housing preferably has a protruding flanged portion which serves to center the suction pipe on the metallic housing. The connection between the suction pipe and the metallic housing should be realized through the use of brazing, soldering or laser welding.

All of the metallic components of the delivery device according to the invention are preferably produced from corrosion-resistant austenitic steel (for example one of the steels with the material number 1.4301 or 1.4828 according to the German "Stahlschlussel" or key to steel) or alternatively from corrosion-resistant ferritic steel (for example from steel with the material number 1.4607 according to the German "Stahlschlussel" or key to steel). The metallic components include, in particular, the base plate, a filter housing, the suction pipe and the housing of the filter device. In this case, the base plate and/or a filter housing may be produced from cast steel or cast aluminum and may, if appropriate, additionally have a coating.

In accordance with a further particularly advantageous feature of the delivery device of the invention, a metallic filter housing in which a filter can be or is disposed, is connected to the base plate.

Liquid reducing agent often contains relatively small particles which could lead to damage to components of the delivery device. Particularly sensitive components of the delivery device are, for example, the valves of the pump or the injector through which reducing agent can be introduced into the exhaust system of an internal combustion engine. For this reason it is advantageous for reducing agent to be filtered. Liquid reducing agent also remains in the filter or in the filter housing surrounding the filter, so that freezing takes place in this case too. It is thus advantageous for the filter housing to be jointly connected in heat-conducting fashion to the metallic base plate, in such a way that efficient heating of the filter housing is also realized, and frozen reducing agent in the filter housing is therefore melted.

The metallic filter housing and the base plate may also be a common component. That component may, for example, be milled or cast from a metal block. It is thus possible for heat to be conducted particularly effectively from the metallic filter housing to the base plate and vice versa. At the same time, with a common component of that type, the outlay for the assembly of the delivery device according to the invention is reduced.

In accordance with an added particularly advantageous feature of the delivery device of the invention, the suction pipe extends together with the heating element into the filter housing.

Such a configuration firstly permits particularly efficient heating of the filter housing. The filter housing is that component in the delivery device which has the greatest volume filled with reducing agent. Accordingly, a particularly large amount of heat energy must be introduced in this case, in particular, in order to melt the reducing agent if it is frozen.

Having the suction pipe jointly extend into the filter housing has numerous advantages. Firstly, the connection between the housing or metallic base plate and the suction pipe is mechanically considerably more stable. Since the suction pipe extends into the filter housing, it is possible for relatively large bending moments, which act, for example, as a result of impacts against the suction pipe during the assembly process or as a result of acceleration processes while the motor vehicle is traveling, to be transmitted from the suction pipe into the housing.

The filter is provided primarily to protect the downstream functional components of the delivery device according to the invention. The filter is therefore, if appropriate, the functional component disposed first along the path of the reducing agent from a tank to the pressure line port of the delivery device. It is therefore particularly advantageous for the suction pipe to extend directly into the filter housing, because this permits a particularly compact and integrated configuration of the delivery device according to the invention.

In accordance with an additional particularly advantageous feature of the delivery device of the invention, a metallic coarse filter for particles larger than 30 μm [micrometers] is formed on the suction pipe.

The filter, which can be disposed in the filter housing on the metallic base plate, is generally constructed for filtering much smaller particles. For example, the filter should retain particles with a diameter of less than 10 μm (micrometers) and preferably particles with a diameter of less than 3 μm (micrometers).

Through the use of a metallic coarse filter provided on the suction pipe, it can be ensured that the filter provided in the housing does not become prematurely blocked. It is thus possible for the service life of the filter in the housing to be extended considerably, as a result of which the service intervals for the delivery device according to the invention can be lengthened.

In accordance with yet another particularly advantageous feature of the delivery device of the invention, the metallic coarse filter includes a screen, which surrounds a suction end of the suction pipe in the manner of a pot. The suction end is generally the lower end of the suction pipe situated opposite the housing of the delivery device.

Reducing agent is generally sucked into the suction pipe at a suction end of the suction pipe. A screen as a constituent part of the metallic coarse filter can be produced particularly inexpensively. Furthermore, a suitably dimensioned screen reduces the sloshing movements of the reducing agent in a reducing agent tank directly around the suction pipe. It is thus possible, with a suitable configuration of the screen, to dispense with a surge pot provided in the tank for reducing the sloshing movements. Sloshing movements in a tank in a motor vehicle are caused by accelerations during driving operation when the vehicle is accelerating, braking or cornering.

It is preferable for the coarse filter or the screen to be fastened so as to be in heat-conducting contact with the heating element.

In accordance with yet a further particularly advantageous feature of the delivery device of the invention, at least one level sensor electrode, through which a fill level of the reducing agent in the tank can be determined, is fastened to the suction pipe.

Through the use of a single punctiform or button-shaped level sensor electrode, it is possible, for example, to determine whether or not a reserve fill level in the reducing agent tank has been undershot. If two punctiform or button-shaped level sensor electrodes are provided, it can additionally be determined whether or not a fill level of the reducing agent tank is present which corresponds to a full reducing agent tank. In the range between the two level sensor electrodes, the fill level of the system can be determined through the use of software which monitors the amounts of reducing agent injected into the exhaust system. It is also possible for an elongate level sensor electrode to be provided which directly determines the fill level in the reducing agent tank in a continuous fashion. Level sensor electrodes can generally determine the fill level through the conductivity of the reducing agent.

A (single punctiform or button-shaped) level sensor electrode may also be affixed to the metallic housing of the delivery device. The metallic housing is then disposed at least partially within a tank configuration for a reducing agent. In this case, the tank configuration can be filled with reducing agent until the reducing agent is also present around the metallic housing. Such a fill level of a tank configuration can also be determined through the use of a level sensor electrode affixed to the metallic housing of the delivery device.

In accordance with yet an added particularly advantageous feature of the delivery device of the invention, the heating element is a PTC (positive temperature coefficient) heating element.

PTC heating elements are based on a PTC heat conductor. Such a heat conductor exhibits an intense increase in electrical resistance above a certain temperature. In this way, a PTC heating element self-regulates to a certain heating temperature. It is preferable in this case for precisely only one PTC heating element to be provided along the intake pipe, which PTC heating element actively heats the delivery device as required.

If appropriate, the required heating action may also be assisted at least partially by the waste heat of the pump, the valve, the filter, etc. during operation.

In accordance with yet an additional particularly advantageous feature of the delivery device of the invention, the suction pipe includes an inner conduit pipe and an outer holding pipe, wherein the heating element is disposed between the conduit pipe and the holding pipe.

An outer holding pipe of this type around the inner conduit pipe and heating element firstly increases the mechanical strength of the suction pipe which projects from the housing. Secondly, a cylindrical external shape of the suction pipe can be selected even though the heating element is provided jointly in the suction pipe in addition to the conduit pipe.

It is preferable for all of the parts of the suction pipe to be composed of metal and to have metallic contact points to one another, in such a way that an efficient exchange of heat between the components is possible and heat is easily transmitted from the heating element to the outer holding pipe. The outer holding pipe is generally in contact with the surrounding reducing agent in a tank and can therefore heat the reducing agent.

In accordance with again another particularly advantageous feature of the delivery device of the invention, the housing and at least the suction pipe or the outer holding pipe are formed in one piece. In a further advantageous embodiment, the housing is formed in one piece together with the suction pipe and the outer holding pipe of the suction pipe. The housing and the outer holding pipe of the suction pipe may preferably be produced together as a deep-drawn part. It is, however, also possible for the housing and the outer holding pipe and/or the suction pipe to initially be separate and to then be connected preferably cohesively to one another in a first production step, in such a way that a single-piece component which includes the housing and the outer holding pipe is initially formed, and for further assembly of the delivery device to take place subsequently. In this case, it is furthermore preferable for the housing on one hand and the suction pipe/holding pipe on the other hand, to have different diameters.

In accordance with again an added particularly advantageous feature of the delivery device of the invention, a return line is provided which has a return valve, and the return valve can be operated as a heater for heating reducing agent. More detailed explanations regarding this embodiment are given further below in conjunction with a ventilation and heating process.

With the objects of the invention in view, there is also provided a tank configuration, comprising a reducing agent tank having a tank opening and a tank bottom, a delivery device according to the invention closing off the tank opening, and the at least one suction pipe extending toward the tank bottom.

A tank configuration for a reducing agent must be closed off during operation in order to ensure that no sloshing of the reducing agent out of the tank configuration can occur. At the same time, a reducing agent tank should have a closable opening of adequate size, through which opening cleaning of the tank can be performed. It has already been described further above that the reducing agent generally contains particles, which can lead to contamination of the reducing agent tank. Closing off the opening of the tank through the use of the housing of the delivery device is technically particularly simple, and it can be realized in a particularly space-saving manner.

The opening of the tank is preferably closed off by the housing of the delivery device in such a way that the suction end of the suction pipe is situated in the vicinity of the bottom of the tank, and in particular is not in contact with the bottom of the tank. A separate bracket for holding the suction end may be provided on or in the tank base. The bracket absorbs, for example, forces on the suction pipe arising, for example, as a result of accelerations during operation of a motor vehicle. The tank for the reducing agent is produced preferably from plastic. The opening of the tank, which is closed off by the housing, may have a screw coupling and the housing may be formed with a corresponding thread. Furthermore, a seal may be provided on the opening. The seal is compressed as a result of the insertion of the housing into the opening and thus seals off the opening in the housing.

In accordance with another feature of the tank configuration of the invention, more than 50% of the housing is disposed below the housing opening. It should, if possible, be provided that even more than 80% and, in particular, approximately 100% of the housing of the delivery device, is disposed below the tank opening.

This configuration of the housing of the delivery device permits a particularly space-saving configuration of the reducing agent tank and housing. The installation space available for the reducing agent tank can be filled out entirely by the reducing agent tank itself. The volume of the tank is available for the reducing agent, and only the volume of the delivery device need be subtracted. In the case of a completely filled tank, the tank may even be filled until reducing agent is present around the housing. In the case of this configuration of the housing of the delivery device in the tank, it is particularly advantageous for the housing together with the suction pipe to be connected in heat-conducting fashion to the metallic base plate. Melting of an ice sheet present in the reducing agent tank can then also take place proceeding from the (metallic) housing. This can be realized in situations where the fill level of the reducing agent in the tank is at the height of the housing. It is particularly advantageous for the housing and the tank opening to be circular. The closure of the reducing agent tank through the use of the housing should be as sealed as possible. Circular, planar contact surfaces between the housing and the tank opening generally make it possible to produce a sealed connection particularly inexpensively.

If appropriate, the delivery device according to the invention can also be described as an extraction pipe which has two different diameters and in which all of the components for providing pressurized liquid reducing agent are jointly integrated. In this case, the diameter of the suction pipe constitutes the first diameter of the extraction pipe, wherein in this case, the diameter of an outer holding pipe of the suction pipe is generally definitive of the first diameter of the extraction pipe. The diameter of the housing is the second diameter of the extraction pipe. The necessary functional components (such as pumps, lines, filters, etc.) can be easily located in the larger diameter of the housing. An extraction pipe which has two different diameters and in which all of the components for providing pressurized liquid reducing agent are jointly integrated is also an invention independently of the features already described above. This invention may self-evidently be combined in any desired manner with all of the preferred embodiments of the filling device according to the invention described herein. For such a variant of the delivery device according to the invention, it is particularly advantageous if the housing is formed in one piece, if appropriate together with the suction pipe and/or the outer holding pipe of the suction pipe.

The tank configuration is also particularly advantageous if the suction pipe has a suction end which is positioned in a depression in the bottom of the tank configuration. It is generally particularly advantageous for the suction of the reducing agent to take place at the lowest point of the tank, because in this way the tank can be virtually completely emptied, or complete utilization of the tank volume is possible. At the same time, a depression in the bottom of the tank may act as a surge pot which ensures that reducing agent is always present around the suction end of the suction pipe even in the event of sloshing movements in the tank.

A method for heating a delivery device according to the invention will now be explained, wherein the delivery device has a return valve which is open when an opening current is provided to the return valve and which, in the closed state, is operated as a heater when a heating current lower than the opening current is provided in the return valve.

This "passive" auxiliary heating process may basically also be combined with other delivery systems, and constitutes an invention on its own.

The delivery device according to the invention generally has a return line which is used for ventilating the delivery device. A return line for ventilation is required, for example, if there is an air bubble in the components which should contain reducing agent. In particular, an air bubble is very difficult to convey through the use of a pump due to the pump movement of the pump. This is true, in particular, for diaphragm pumps with passive valves, such as are preferable for the delivery device according to the invention. The system can initially be operated, through the use of the return line, in such a way that reducing agent sucked in is conveyed at a low delivery pressure through the suction pipe and the return line and back into the tank in a circuit until there is no more air in the delivery device. In normal operation of the delivery device, in which pressurized reducing agent is to be provided, the return line is closed off in such a way that the pressure built up in the delivery device by the pump is not dissipated. In this case, a return valve is provided for the return line and/or for closing the return line. For the method described, a valve is used which is open when an electrical current is passed through it and which is closed when no electrical current is passing through it. The use of such a valve is also preferable because the normal state is the closed state in which pressure prevails in the delivery device, and the open state is encountered less frequently than the closed state. For this reason, energy can be saved through the use of a return valve of this type. It is now particularly advantageous if the return valve can also be operated with a current which is not sufficient to open the return valve. In this case, the electrical, current-conducting windings in the return valve act as a heating resistor through the use of which the delivery device and/or (indirectly through the metallic base plate) the possibly frozen reducing agent contained in the delivery device, is heated. Due to the heat-conducting connection from the return valve to the metallic base plate and therefore also to the metallic housing and to the metallic suction pipe, heating of the reducing agent in the reducing agent tank is also possible through the use of a return valve operated as a heater. The use of such a return valve as a heater should also be regarded as an invention independently of the other features of the delivery device according to the invention. At the same time, the explanations given herein regarding the return valve and regarding the return line are also valid independently of the return valve used as a heater, and constitute possible improvements to the delivery device according to the invention.

With the objects of the invention in view, there is concomitantly provided a motor vehicle, comprising an internal combustion engine, an exhaust system constructed to perform a selective catalytic reduction of nitrogen oxide compounds, and a tank configuration according to the invention or a delivery device according to the invention.

The embodiments and advantages discussed with regard to the delivery device according to the invention are transferable analogously to the motor vehicle, to the heating and ventilation method and to the tank configuration.

Other features which are considered as characteristic for the invention are set forth in the appended claims, noting that the features specified individually in the claims may be combined with one another in any desired technologically meaningful way and may be supplemented by explanatory facts from the description, with further structual variants of the invention being specified.

Although the invention is illustrated and described herein as embodied in a delivery device and a tank configuration for a reducing agent and a motor vehicle having a tank configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
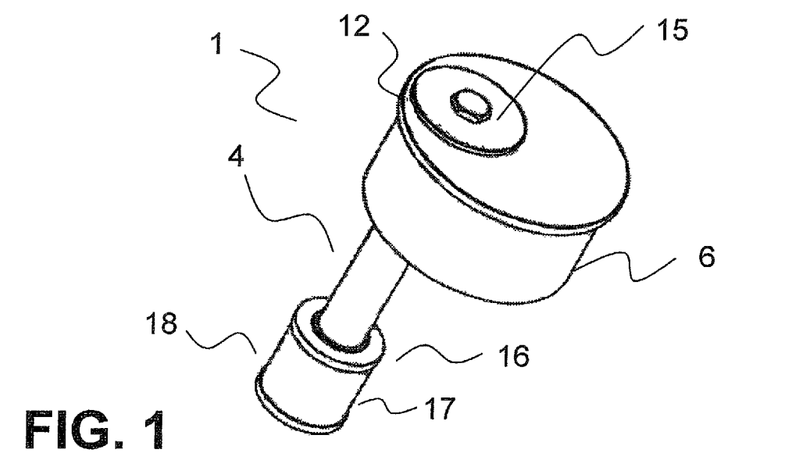
FIG. 1 is a diagrammatic, perspective view of a delivery device according to the invention.

Referring now to the figures of the drawings in detail and first, particularly, to FIG. 1 thereof, there is seen a delivery device 1 according to the invention. The delivery device 1 has a metallic housing 6 and a metallic suction pipe 4. A coarse filter 16, which has a screen 17, is provided at a suction end 18 of the suction pipe 4. The housing 6 has a flange 12 with which the housing 6 can be sealed off against a corresponding flange, for example on a tank configuration. A cover 15, which is also provided in the housing 6, can be opened and servicing of the delivery device 1 according to the invention can, for example, take place therethrough. It is, for example, possible for a non-illustrated filter in the delivery device 1 to be exchanged through the cover 15.

Figure 2:
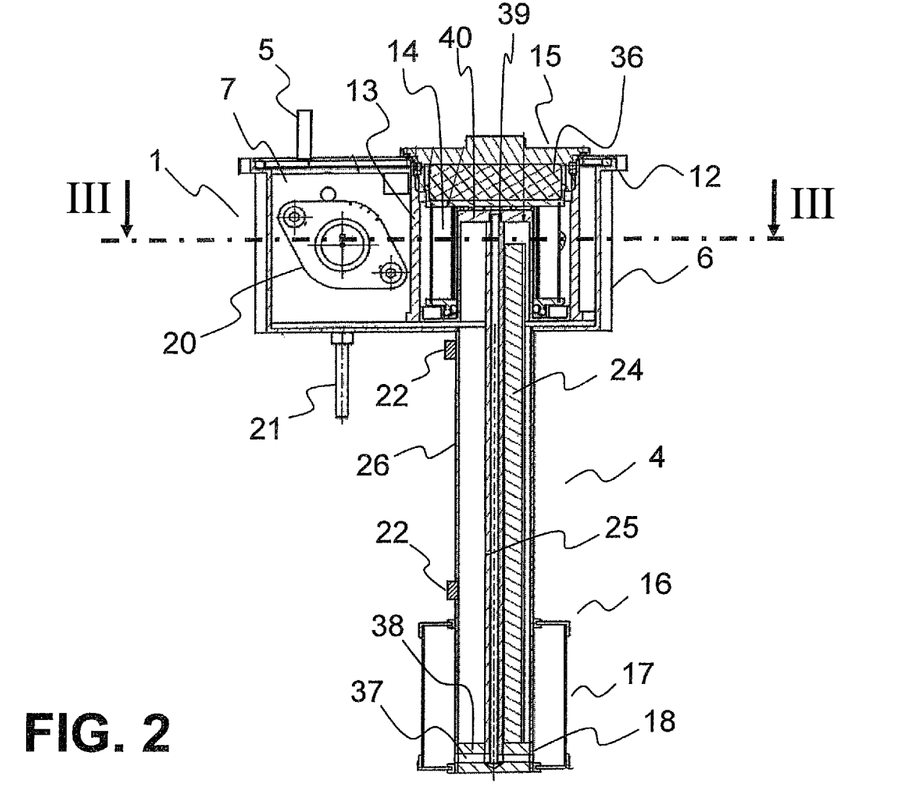
FIG. 2 is a longitudinal-sectional view of a first variant of the delivery device according to the invention.

FIG. 2 is a sectional view through a delivery device 1 according to the invention. This figure, too, shows the housing 6 and the suction pipe 4. Important components of the delivery device according to the invention are fastened to a metallic base plate 7 which is provided in the housing 6. FIG. 2 shows a (metallic) filter housing 13 and a return valve 20 as components. A filter 14 is also provided in the filter housing 13. Direct access to the filter housing 13 is possible through the cover 15 in the housing 6, in such a way that the filter 14 can be exchanged quickly and easily. In an advantageous embodiment, the filter housing 13 is sealed off against the housing 6 in such a way that the interior space of the filter housing 13 is closed off with respect to the interior space of the housing 6 even when the cover 15 is open. A reducing agent in the housing 6 can thus be prevented from reaching locations which it must not reach, even during an exchange of the filter 14. The possibility of exchanging the filter 14 through a cover 15 is particularly advantageous because the filter 14 is generally the component which must be serviced most frequently in the delivery device according to the invention.

In a variant of the delivery device 1 according to the invention, the filter 14 may be constructed as a filter cartridge. The delivery device 1 and the filter 14 may each have connection elements which, when the filter 14 is installed, produce at least a fluidic connection between the filter 14 and the delivery device 15. The connection elements may furthermore be constructed in such a way that both the filter 14 and also the delivery device 1 are closed off in a fluid-tight manner when the filter 14 is removed from the delivery device 1. It can thus be ensured that reducing agent does not emerge either from the delivery device 1 or from the filter 14 when the filter 14 is removed from the delivery device 1. In such an embodiment, an exchange of the filter 14 can be carried out in a safe and reliable manner.

A compensation element 36 may also be provided in the cover 15. A compensation element 36 of that type may, for example, take the form of elastic filler material (for example porous rubber) in order to compensate expansions of the reducing agent when it freezes, so that the delivery device 1 according to the invention is not damaged by the freezing process.

In an advantageous embodiment of the delivery device 1 according to the invention, all of the components of the filter device 1 aside from the filter 14 are constructed and dimensioned in such a way that they need not be exchanged over the service life of the delivery device 1, and the housing 6 of the filter device 1 (aside from the cover 15) is constructed so as to be sturdy, durable and in such a way that it cannot be opened without being destroyed.

It can also be seen that the flange 12 of the housing 6 is provided for connection of the housing 6, for example to a reducing agent tank. A pressure line port 5, through which pressurized reducing agent can be conveyed out of the delivery device 1, is provided on top of the housing 6. The pressure line port 5 may be provided directly on the metallic base plate 7, or integrally cast with the metallic base plate 7 if the latter is formed as a cast part. It is thus possible to attain very good heat transfer between the pressure line port 5 and the metallic base plate 7. The pressure line port 5 can then be jointly heated passively (through the use of heat conduction) through the metallic base plate 7. The pressure line port 5 is preferably produced from a material with good heat conductivity. The pressure line port 5 is preferably produced from aluminum or stainless steel. A return line 21 exits the housing 6 at the bottom. The reducing agent can pass from the delivery device 1, through the return line 21, back into a reducing agent tank when the return valve 20 is open.

The intake pipe 4 is constructed from an inner conduit pipe 25 and an outer holding pipe 26. A (single PTC) heating element 24, which is provided between the inner conduit pipe 25 and the holding pipe 26, extends along the suction pipe 4 into the housing 6 and/or the filter housing 13. The fill level of reducing agent can be determined through the use of level sensor electrodes 22, which are also provided on the suction pipe 4. As is seen in FIG. 2, the coarse filter 16 having the screen 17 is also provided at the suction end 18 of the suction pipe 4.

An inner filter housing 40, for accommodating the heating element 24, is generally situated in the filter housing 13, as an extension of the outer holding pipe 26 of the suction pipe 4. A connecting point 39 between the inner filter housing 40 and the inner conduit pipe 25 is generally very important for the leak-tightness of the delivery device 1 according to the invention. The connecting point 39 should be either brazed, soldered or laser-welded and/or formed with at least one O-ring seal. The leak-tightness of the connecting point 39 is necessary because, otherwise, reducing agent could penetrate into the housing 6 of the delivery device 1 during operation. If the connecting point 39 is brazed, soldered or laser-welded, the heating element 24 cannot be accessed after assembly without destroying the delivery device 1. If the connecting point 39 is formed with an O-ring seal, the heating element 24 of the delivery device 1 can be exchanged.

In the embodiment of the delivery device 1 shown herein, the suction of reducing agent takes place at the suction end 18 of the suction pipe 4, through radial bores 37. The radial bores 37 extend through the outer holding pipe 26, the inner conduit pipe 25 and a plug 38 which connects the outer holding pipe 26 and the inner conduit pipe 25 to one another in a lower region at the suction end 18 and which at the same time seals off an intermediate space between the outer holding pipe 26 and the inner conduit pipe 25 with respect to the environment. A plurality of radial bores 37 may be provided at the suction end 18. The plug 38 is preferably metallic and brazed, soldered or welded to the inner conduit pipe 25 and to the outer holding pipe 26.

Figure 3:
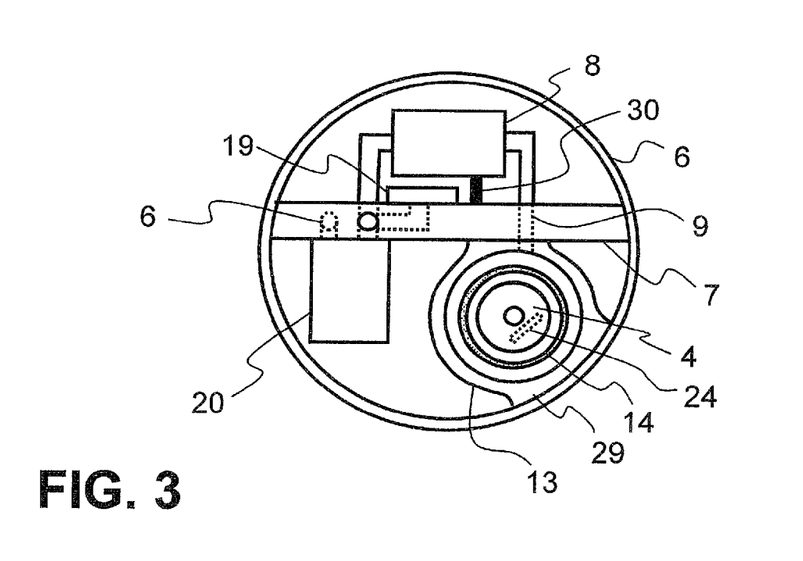
FIG. 3 is a cross-sectional view of a further delivery device according to the invention, which is taken along a line III-III of FIG. 2, in the direction of the arrows.

FIG. 3 shows a further sectional view through the delivery device 1 according to the invention, in which the section through the housing 6 has been selected as indicated by a line III-III in FIG. 2. A pump 8, the return valve 20, a pressure sensor 19 and the filter housing 13 are provided on the metallic base plate 7, as is visible in the housing 6 in FIG. 3. Fluidic connections are produced between the pump 8, the pressure sensor 19, the filter housing 13 and the return valve 20, through ducts 9 provided in the metallic base plate 7. The filter 14 is disposed in the filter housing 13. As viewed from above, it is possible to see the suction pipe 4 and the heating element 24 within the filter housing. The individual components of the system such as, for example, the filter housing 13, the housing 6 or the suction pipe 4, are in heat-conducting contact through contact surfaces 29. A transfer of heat from one component to an adjacent component is also possible through the contact surfaces 29. If components of the system are disposed so as to be spaced apart from one another for structural reasons, a heat-conducting connection may also be produced through the use of heat bridges 30. Such a heat bridge 30 is illustrated herein by way of example between the metallic base plate 7 and the pump 8.

Figure 4:
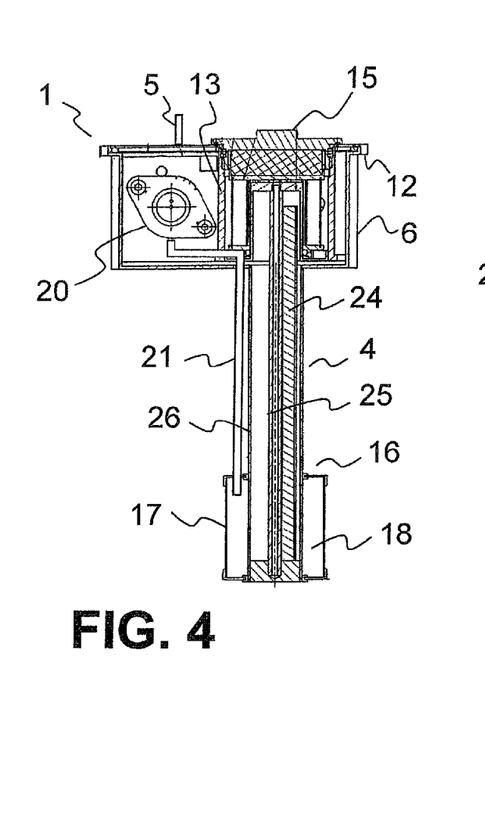
FIG. 4 is a longitudinal-sectional view of a further embodiment of a delivery device according to the invention.
Figure 5:
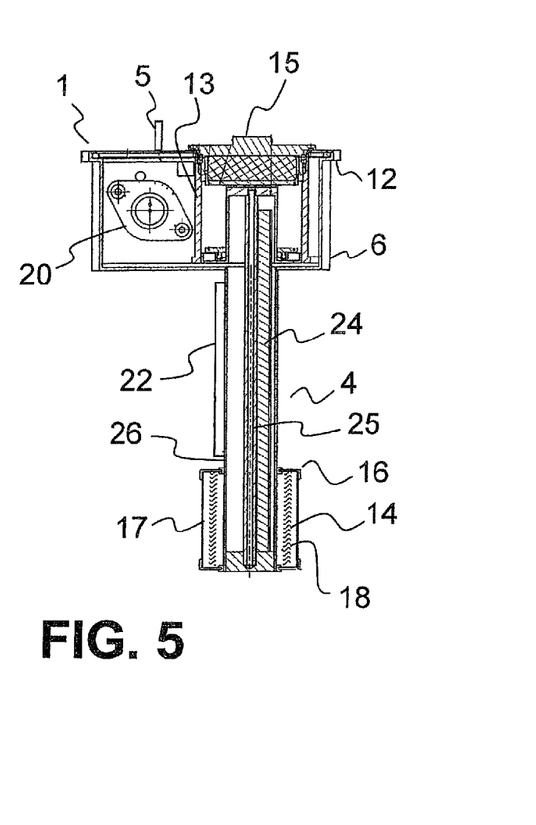
FIG. 5 is a longitudinal-sectional view of yet a further embodiment of a delivery device according to the invention.

FIGS. 4 and 5 are sectional views through further preferred embodiments of the delivery device 1 according to the invention. Both figures show the housing 6, the pressure line port 5, the filter housing 13, the cover 15, the flange 12 and the return valve 20. The suction pipe 4 with the inner conduit pipe 25, the outer holding pipe 26 and the heating element 24, are also visible. In both embodiments according to FIGS. 4 and 5, the coarse filter 16 having the screen 17 is provided at the suction end 18 of the suction pipe 4.

As a special feature, the embodiment according to FIG. 4 has a return line 21 which leads into an intermediate space between the coarse filter 16 and the suction pipe 4. As a result of this special layout of the return line 21, it is possible for the coarse filter 16 to be flushed out from the inside when reducing agent is returned through the return line 21. In this way, it is possible to ensure particularly good permeability of the coarse filter 16 even over a long operating period of the delivery device 1 according to the invention.

The embodiment according to FIG. 5 has, as a special feature, an elongate level sensor electrode 22 through which a fill level 23 (shown in FIG. 6) of a reducing agent tank can be determined in a continuous fashion. Furthermore, in the embodiment according to FIG. 5, a filter 14 is provided in the intermediate space between the coarse filter 16 and the suction line 4 at the suction end 18 of the suction line 4. In this way, it is possible to dispense with a filter 14 in the filter housing 13. This makes the system according to FIG. 5 particularly inexpensive. If an opening is additionally provided in a reducing agent tank below the suction end 18, an exchange of the filter 14 can be carried out in a particularly simple manner without it being necessary to open the delivery device 1 according to the invention through the use of the cover 15. The opening of a tank in the downward direction furthermore has the advantage of permitting deposits which form in the tank to be discharged out of the tank very easily.

The various features of the embodiments of the delivery device according to the invention shown in FIGS. 2, 4 and 5 may be combined with one another in any desired technologically meaningful way within the context of the invention.

Figure 6:
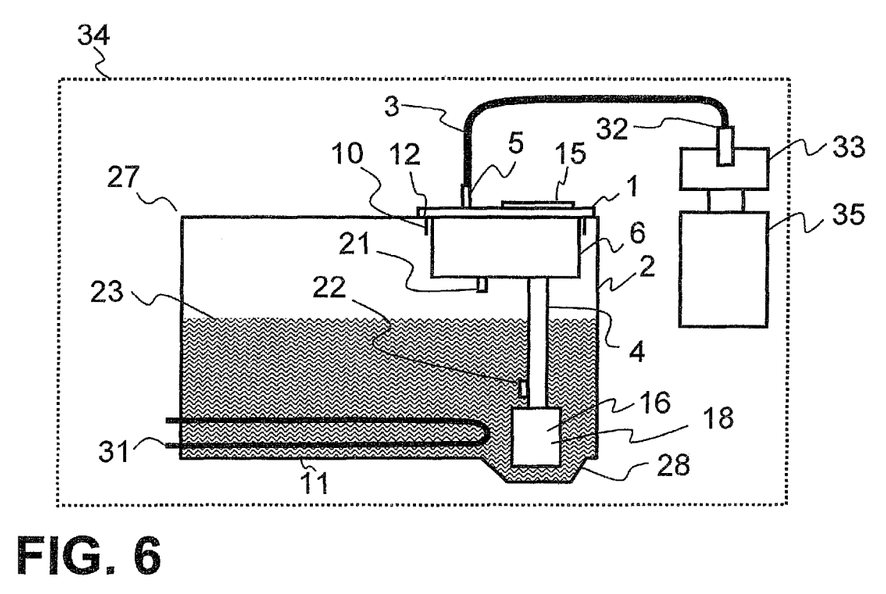
FIG. 6 is a side-elevational view of part of a motor vehicle having a tank configuration according to the invention which has a delivery device according to the invention.

FIG. 6 shows a motor vehicle 34 having an internal combustion engine 35 and an exhaust system 33. Reducing agent is supplied into the exhaust system 33 through an injector 32. The exhaust system 33 is provided for carrying out a selective catalytic reduction. The motor vehicle 34 has a tank configuration 27 in which a delivery device 1 is disposed. The delivery device 1 closes off an opening 10 of a reducing agent tank 2 of the tank configuration 27 in such a way that a flange 12 of the delivery device 1 connects to a corresponding counterpart flange at the opening 10. The cover 15, the suction pipe 4, the coarse filter 16, the return line 21 and the housing 6, are also visible on the delivery device 1 in FIG. 6. Furthermore, the fill level 23 in the reducing agent tank 2 can be determined through the use of a level sensor electrode 22 fastened to the suction pipe 4. The reducing agent tank 2 is provided with a tank bottom 11 which has a depression 28 in the region of the suction end 18 of the suction line 4, in such a way that the tank can be virtually completely emptied. A tank heating device 31, which may be provided in the reducing agent tank 2, serves to heat the reducing agent in the tank in addition to the heating action provided through the use of the delivery device 1 according to the invention. Such heating of the reducing agent in the reducing agent tank 2 may be realized, for example, through the use of cooling water. The pressure line port 5 of the delivery device 1 is adjoined by a line 3 through which pressurized reducing agent is delivered by the delivery device 1 to the injector 32 and into the exhaust system 33.

A double O-ring seal composed of two parallel O-ring seals disposed preferably concentrically adjacent one another, is generally provided between the flange 12 of the delivery device 1 and the opening 10 of the reducing agent tank 2 of the tank configuration 27. A double O-ring seal of that type can also seal off the connection between the delivery device 1 and the reducing agent tank 2, if that connection lies below the maximum fill level 23 of the reducing agent tank 2. The reducing agent tank 2 is generally composed of metal in the region of the opening 2. The sealing through the use of the O-ring seal consequently takes place between two metallic surfaces. Metallic surfaces can generally be produced with greater precision than plastic surfaces. Accordingly, with a double O-ring seal, correspondingly leak-tight sealing can be realized in this case. The connection between the delivery device 1 and the reducing agent tank 2 at the opening 10 is realized preferably through the use of an SAE screw connection.

The delivery device according to the invention and the tank configuration according to the invention are of particularly simple and inexpensive construction and simultaneously permit a high level of safety and high reliability in the provision of reducing agent. The delivery device and tank configuration therefore represent a considerable improvement over the prior art.

The invention claimed is:

1. A tank configuration, comprising:
   a reducing agent tank having a tank opening and a tank bottom;
   a delivery device for a reducing agent, said delivery device closing off said tank opening and said delivery device including:
      a metallic housing disposed at least partially within said reducing agent tank and having an outside, at least one metallic suction pipe fastened to said outside of said metallic housing inside said reducing agent tank and extending toward said tank bottom and said metallic housing having an external pressure line port and an interior;
      a separate metallic base plate disposed in said metallic housing and extending through said interior of said metallic housing;
      at least one pump and ducts mounted on said metallic base plate and fluidically connected through said metallic base plate;
      said at least one metallic suction pipe, said metallic housing, said metallic base plate and said at least one pump being in heat-conducting contact with one another by metallic connecting points; and
      an elongate heating element disposed parallel to said at least one metallic suction pipe;
      said metallic housing and said at least one metallic suction pipe configured to transfer heat from said elongate heating element to the environment of the delivery device inside said reducing agent tank.

2. The tank configuration according to claim 1, wherein said ducts are formed in said metallic base plate, and said at least one suction pipe, said at least one pump and said line port are fluidically connected by said ducts in said metallic base plate.

3. The tank configuration according to claim 1, which further comprises a metallic filter housing connected in heat-conducting fashion to said base plate, and a filter configured to be disposed in said metallic filter housing.

4. The tank configuration according to claim 3, wherein said at least one suction pipe and said heating element extend together into said metallic filter housing.

5. The tank configuration according to claim 1, which further comprises a metallic coarse filter formed on said at least one suction pipe for particles larger than 30 μm.

6. The tank configuration according to claim 5, wherein said at least one suction pipe has a suction end, and said metallic coarse filter includes a pot-shaped screen surrounding said suction end.

7. The tank configuration according to claim 1, which further comprises a reducing agent tank having a reducing agent fill level, and at least one level sensor electrode fastened to said suction pipe for determining said reducing agent fill level.

8. The tank configuration according to claim 1, wherein said heating element is a PTC (positive temperature coefficient) heating element.

9. The tank configuration according to claim 1, wherein said at least one suction pipe includes an inner conduit pipe and an outer holding pipe, and said heating element is disposed between said inner conduit pipe and said outer holding pipe.

10. The tank configuration according to claim 9, wherein said metallic housing and said outer holding pipe are formed in one piece.

11. The tank configuration according to claim 1, wherein said metallic housing and said at least one suction pipe are formed in one piece.

12. The tank configuration according to claim 1, which further comprises a return line having a return valve, said return valve configured to be operated as a heater for heating reducing agent.

13. The tank configuration according to claim 1, wherein more than 50% of said metallic housing is disposed below said tank opening.

14. A motor vehicle, comprising:
   an internal combustion engine;
   an exhaust system associated with said internal combustion engine and constructed to perform a selective catalytic reduction of nitrogen oxide compounds; and
   a tank configuration according to claim 1.

15. The tank configuration according to claim 1, wherein said metallic housing and said at least one metallic suction pipe are configured to transfer enough heat from said elongate heating element to melt ice inside said reducing agent tank.

16. The tank configuration according to claim 1, which further comprises a clamp pressing said elongate heating element against said suction pipe.

* * * * *